March 22, 1966   W. M. McCONNELL   3,241,847
APPARATUS FOR SUPPORTING AND POSITIONING A WORKPIECE
Original Filed March 30, 1960   8 Sheets-Sheet 1

INVENTOR.
William Mynard McConnell

BY Webb, Mackey & Burden
HIS ATTORNEYS

March 22, 1966 W. M. McCONNELL 3,241,847
APPARATUS FOR SUPPORTING AND POSITIONING A WORKPIECE
Original Filed March 30, 1960 8 Sheets-Sheet 2

INVENTOR.
William Mynard McConnell
BY
Webb, Mackey + Burden
HIS ATTORNEYS

March 22, 1966 W. M. McCONNELL 3,241,847
APPARATUS FOR SUPPORTING AND POSITIONING A WORKPIECE
Original Filed March 30, 1960 8 Sheets-Sheet 3
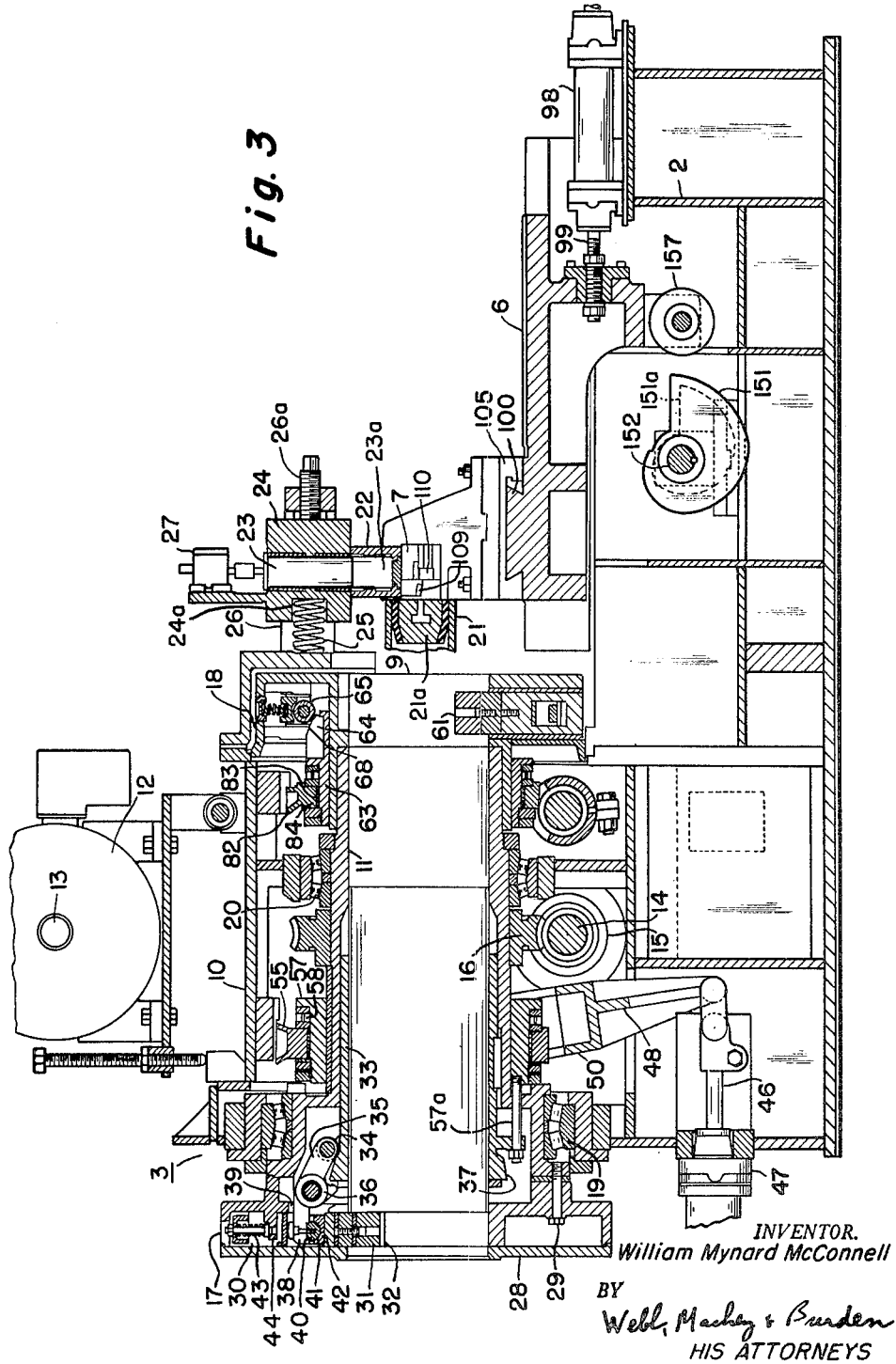
INVENTOR.
William Mynard McConnell
BY
Webb, Mackey & Burden
HIS ATTORNEYS

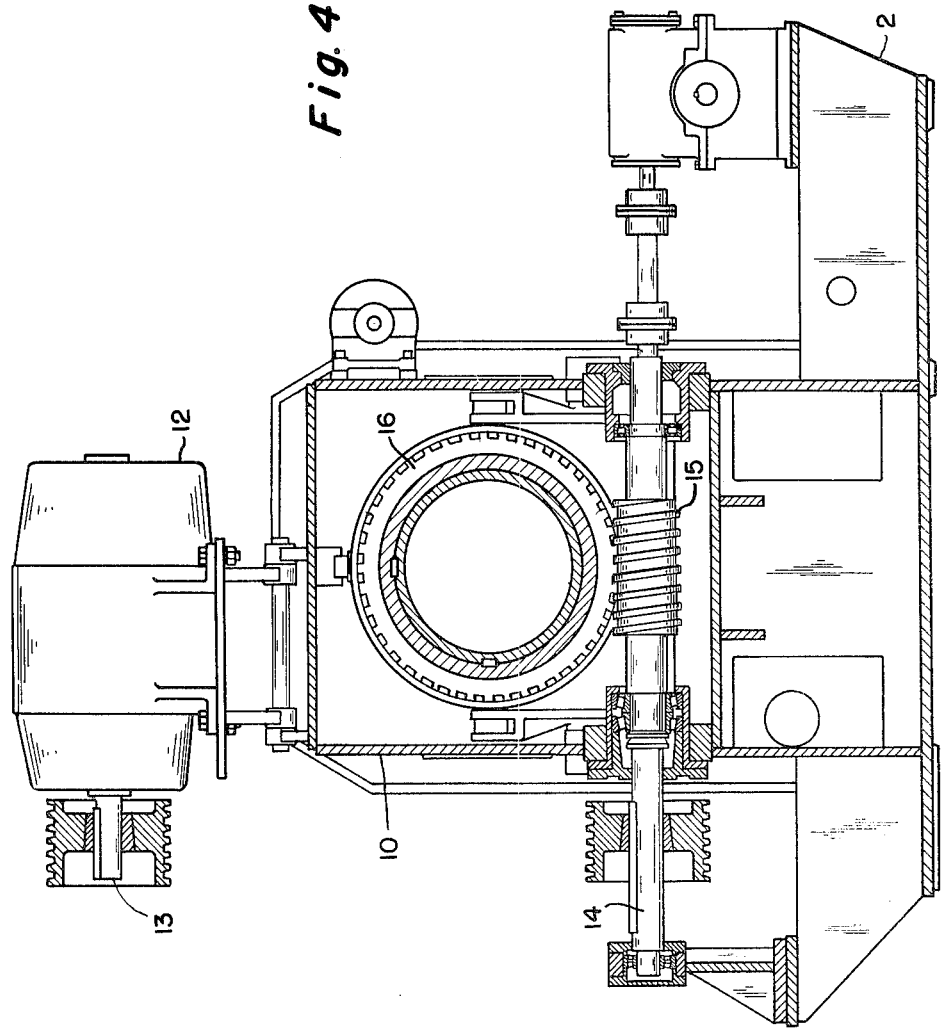

March 22, 1966  W. M. McCONNELL  3,241,847
APPARATUS FOR SUPPORTING AND POSITIONING A WORKPIECE
Original Filed March 30, 1960  8 Sheets-Sheet 5

INVENTOR.
William Mynard McConnell
BY Webb, Mackey + Burden
HIS ATTORNEYS

March 22, 1966     W. M. McCONNELL     3,241,847
APPARATUS FOR SUPPORTING AND POSITIONING A WORKPIECE
Original Filed March 30, 1960     8 Sheets-Sheet 6
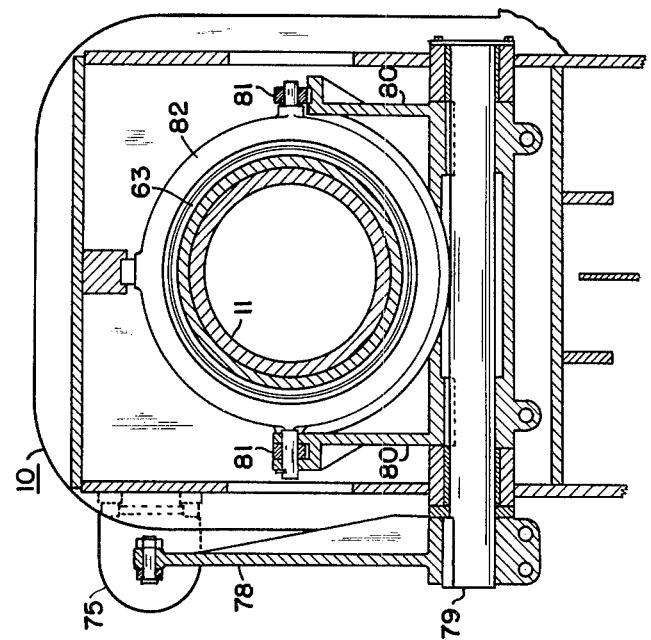
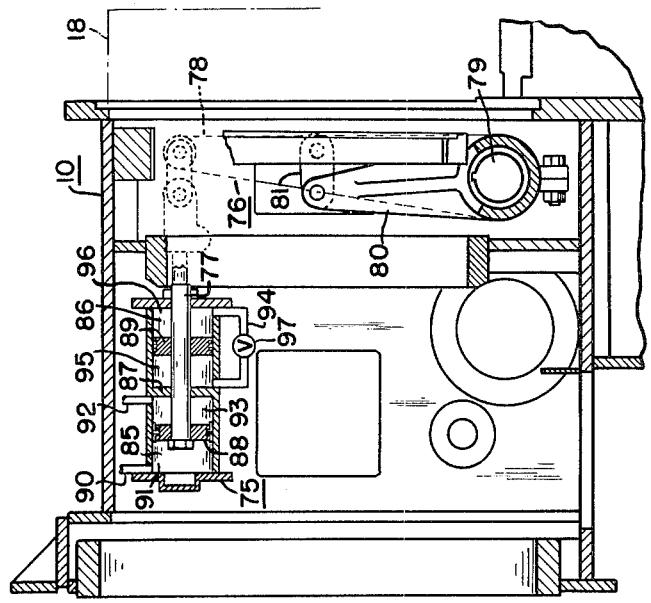
INVENTOR.
William Mynard McConnell
BY Webb, Mackey & Burden
HIS ATTORNEYS March 22, 1966 W. M. McCONNELL 3,241,847
APPARATUS FOR SUPPORTING AND POSITIONING A WORKPIECE
Original Filed March 30, 1960 8 Sheets-Sheet 7

INVENTOR.
William Mynard McConnell

BY Webb, Mackey + Burden
HIS ATTORNEYS

March 22, 1966  W. M. McCONNELL  3,241,847
APPARATUS FOR SUPPORTING AND POSITIONING A WORKPIECE
Original Filed March 30, 1960  8 Sheets-Sheet 8
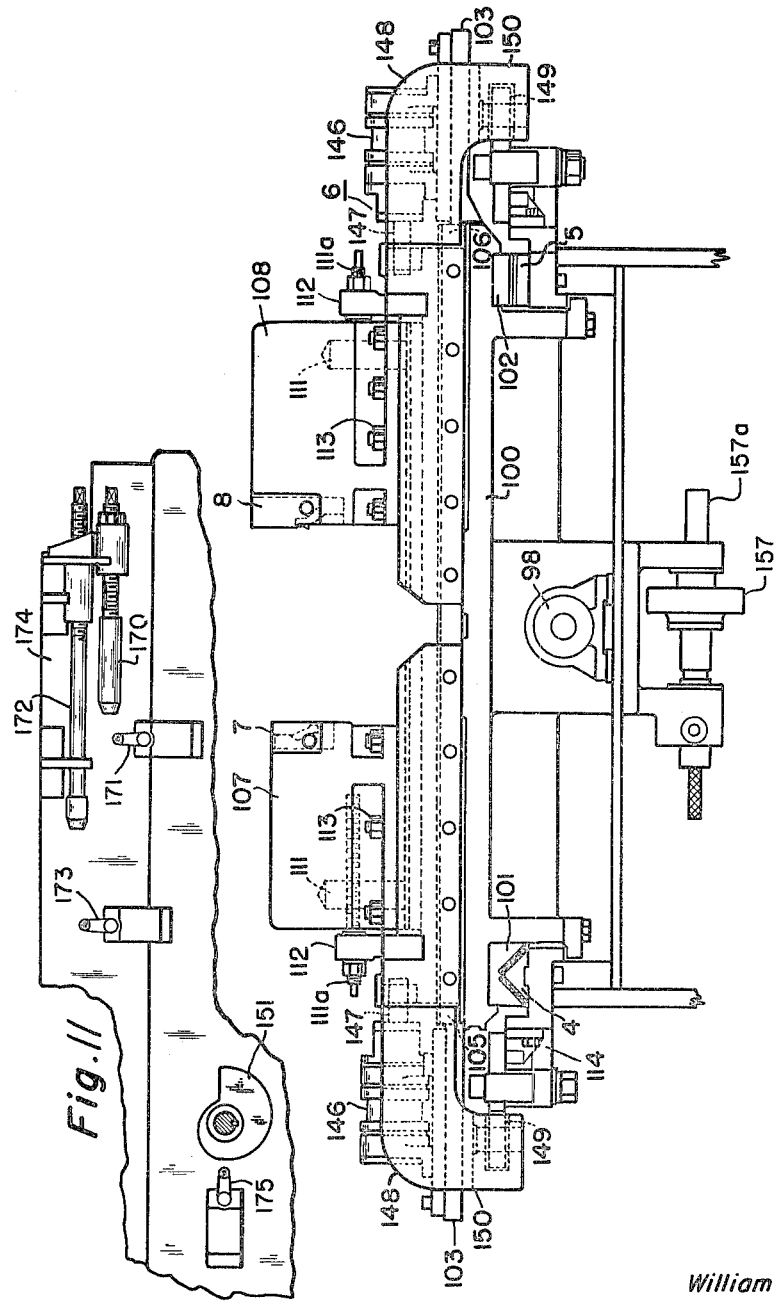
INVENTOR.
William Mynard McConnell
BY Webb, Mackey & Burden
HIS ATTORNEYS

United States Patent Office

3,241,847
Patented Mar. 22, 1966

3,241,847
APPARATUS FOR SUPPORTING AND
POSITIONING A WORKPIECE
William Mynard McConnell, Pittsburgh, Pa., assignor to
Taylor-Wilson Manufacturing Co., Pittsburgh, Pa., a
corporation of Pennsylvania
Original application May 30, 1960, Ser. No. 18,578, now
Patent No. 3,128,482, dated Apr. 14, 1964. Divided
and this application Feb. 6, 1964, Ser. No. 343,062
8 Claims. (Cl. 279—4)

This application is a division of my application Serial No. 18,578, filed March 30, 1960, now Patent No. 3,128,-482 and relating to "Method of Supporting and Rotating Pipe for Threading Operation."

This invention relates to apparatus which supports and positions a workpiece, such as a bar, rod, pipe, tube and the like, preparatory to performing a work operation thereon, such as machining, tapering, threading, etc. The invention has particular application to pipe threading machines which impart taper and threads to ends of pipe and tubing used in oil well drilling operations, in pipe lines which convey petroleum products or gas over long distances, and in chemical plants, etc.

In tapering and threading ends of large diameter and long length pipe, support of the pipe along its length during tapering and threading operations and particularly adjacent the end which is to be tapered and threaded presents serious problems. Usually, the pipe to be tapered and threaded is ovalled and, accordingly the end to be threaded must be fimly and securely supported when presenting it to a tool or tools which taper and thread. However, the end of the pipe including that part immediately adjacent thereto must not be gripped by an excessive pressure which temporarily rounds the ovalled end during threading so that when the excessive pressure is released after the threading operation, the end returns to its ovalled shape and the threads imparted to the end are out of round. An end of a length of pipe with its threads out of round does not properly receive or accommodate a coupling, thereby preventing satisfactory connection with another length of pipe and subjecting the length to rejection. Even though an end of a length of pipe is ovalled, if its threads are round, the end satisfactorily receives a coupling, and the length may then be used as a part of a pipe line or a drilling shaft on an oil well rig.

Some lengths of pipe have longitudinal bow or camber which causes the end to be threaded to whip around when the pipe is rotated about its longitudinal axis. Whipping of the end makes threading and tapering difficult and also subjects the tools for tapering and threading to damage and/or excessive wear. Accordingly, positioning and supporting of the end during tapering and threading operations avoid damage to and excessive wear of the tools.

Efficient, easy and fast attachment of couplings to a pipe and of lengths of pipe to each other is hindered by lack of uniformity in taper of the ends of the pipe and/or in lack of uniformity in pitch of the threads. Many pipe threading machines use a combination of chasers disposed in a housing or other similar device to impart both taper and threading to the end of the pipe. To obtain a specified amount of taper, a user positions each chaser relative to the others so that the required amount of taper results. In other words, the user must adjust carefully the position of each chaser relative to the longitudinal axis of its housing or support so that the required degree of taper results when the end of the pipe is subjected to the chaser combination. Some adjustments of the chasers to produce the required degree of taper are in thousandths of an inch and, consequently, accurate positioning of the chasers is a difficult and time-consuming operation accompanied at times by guess-work on the part of the operator of the threading machine. As a result, amounts of taper produced are not uniform and do not meet specification.

My invention supports a length of pipe so that ovalling of the end to be threaded is avoided while firmly and securely supporting the pipe along its length and particularly adjacent the end to be tapered and/or threaded. Also, my invention has ability to support and to maintain in a given position a length of cambered or bowed pipe so that the end to be tapered or threaded does not whip during the tapering and threading operation. In addition, my invention does not round an ovalled end and imparts to the end uniform taper and uniform pitch in the threads on a single machine. Specifically, my invention comprises a chuck for engaging and holding a workpiece, and includes a housing, which has an opening for receiving therein the workpiece. The housing movably mounts at least two jaws arranged for travel into and out of engagement with the periphery of the workpiece. Connected to the jaws are linkage means which, in turn are joined to means for moving the jaws into and out of engagement with the workpiece. Also connected to the jaws is a lock means which resists radial movement of the jaws when same engage the workpiece and which effects this resistance to radial movement without application of pressure to the workpiece. The chuck also has a means for connecting and disconnecting the lock means to and from the jaws.

My invention further relates to a pipe threading machine which has a frame and comprises a rotatable sleeve mounted on the frame and adapted to be connected to a source of power for rotating same. This sleeve receives a length of pipe therein including an end of the length which is to be threaded so that this end extends a short distance out through one end of the sleeve. The sleeve supports a first chuck which is rotatable therewith and which is located on the sleeve substantially adjacent the end thereof opposite that end of the sleeve through which the end of the pipe extends.

The first chuck has movable jaws with biting edges and a means connected to the jaws for moving same into and out of engagement with the periphery of the pipe.

The sleeve also supports a second chuck which is rotatable therewith and positioned substantially adjacent the end of the sleeve through which the end of the pipe extends. It has jaws adapted to engage and shaped to fit around at least a part of the periphery of the pipe, and these jaws are connected to means for moving them into and out of engagement with the pipe.

Also connected to the jaws of the second chuck is a lock means which, acting through the jaws, resists radial movement of the pipe without application of pressure thereto when the jaws engage the pipe. The jaws have a means for connecting and disconnecting the lock means to and from same.

In the accompanying drawings I have shown a preferred embodiment of my invention in which:

FIGURE 3 is a section view along the line III—III of FIGURE 2;

FIGURE 4 is a section view along the line IV—IV of FIGURE 2;

FIGURE 7 is a side elevation view partly in section of a shifter mechanism for a secondary or steady rest chuck of the threader of FIGURE 1;

FIGURE 8 is a cross section view of the shifter mechanism of FIGURE 7;

FIGURE 10 is an end elevation view of a carriage which mounts tool holders, tools and chasers of the threader of FIGURE 1; and FIGURE 11 is a partial side elevation view of components of a control combination for regulating travel of the carriage.

Figure 1:
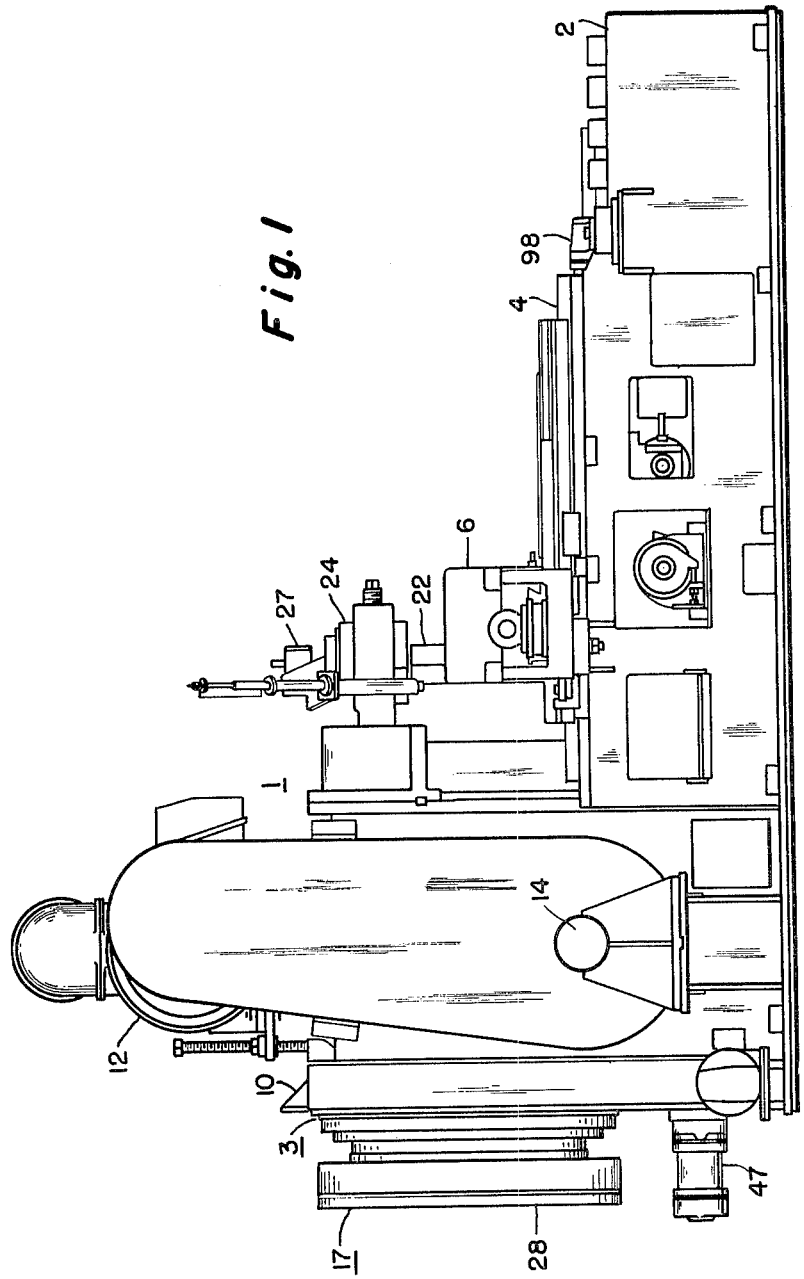
FIGURE 1 is a side elevation view of a pipe threader embodying my invention.
Figure 2:
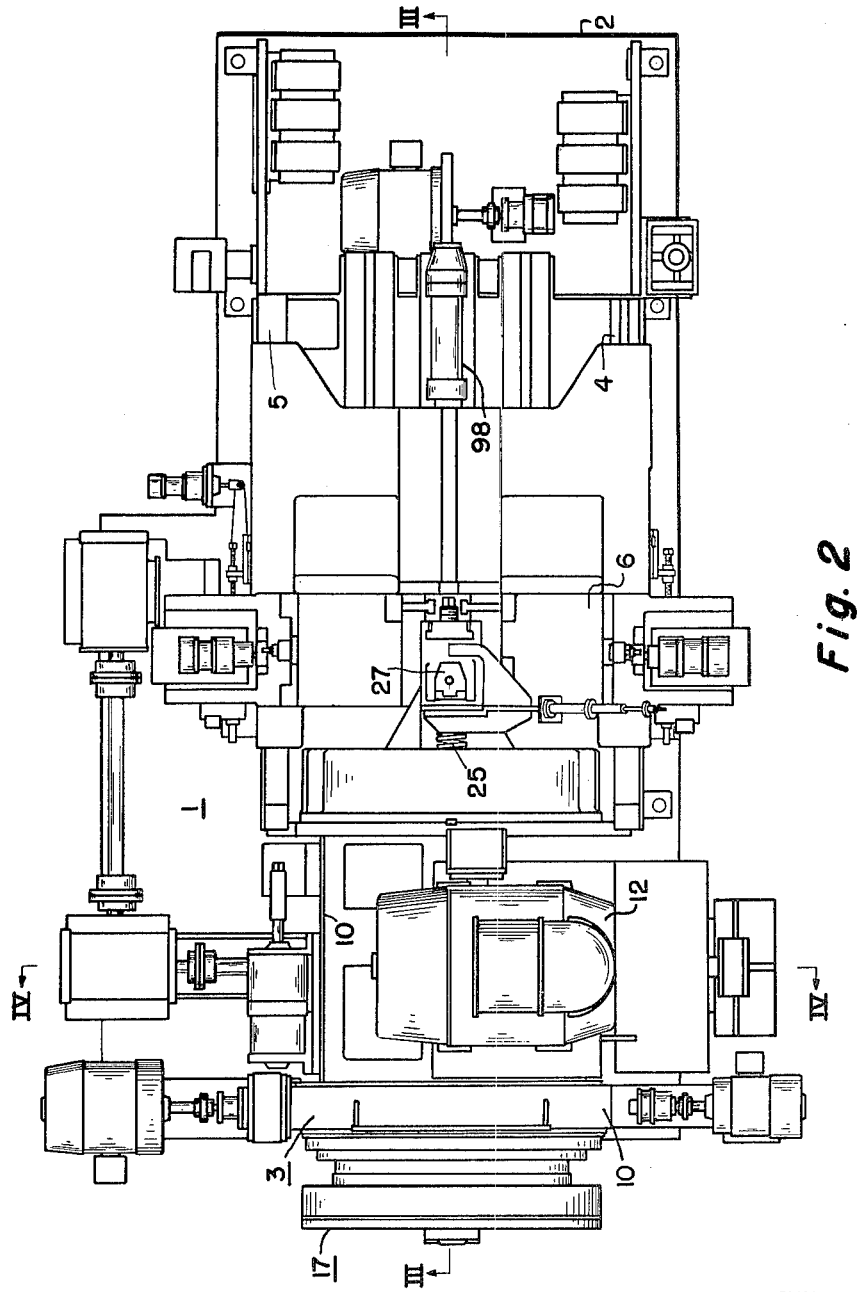
FIGURE 2 is plan view of the pipe threader of FIGURE 1.

FIGURES 1–3, inclusive, and 10 show a pipe threader 1 comprising a frame 2 which mounts a pipe receiver 3 for accommodating and supporting a part of a length of pipe including an end to be tapered and threaded. Disposed for travel on ways 4 and 5 of the frame 1 and located to the right of the pipe receiver, viewing FIGURES 1 and 3, is a carriage 6 supporting two tool holders 7 and 8 each of which mounts a tool for tapering the end of the pipe and a chaser for imparting threads thereto. The carriage is positioned on the frame to bring the tools and chasers into engagement with the end of a length of pipe disposed in the pipe receiver 3 which end extends a short distance out through the end 9 of the receiver 3.

Referring to FIGURES 1, 3, and 4, the pipe receiver comprises a housing 10 which mounts therein a rotatable barrel 11 driven by a threader motor 12 positioned atop the threader. A shaft 13 of the motor is connected to a drive shaft 14 disposed transversely to and beneath the barrel 11 with the drive shaft mounting a first worm 15 which meshes with a gear 16 carried by the barrel 11. Belts (not shown) connect the motor shaft 13 to the drive shaft 14 and thereby transmit rotating power to the drive shaft for rotating the barrel 11.

Affixed to the left-hand end of the barrel 11, viewing FIGURE 3, and rotatable therewith is a primary chuck 17, and affixed to the right-hand end of the barrel and also rotatable therewith is a secondary or steady rest chuck 18. In FIGURE 3 both chucks are in open position. As shown, the barrel 11 rotates upon roller bearings 19 and 20 carried by the housing 10.

The barrel receives and accommodates part of a length of pipe 21 including the end to be threaded and tapered which extends out through the steady rest chuck and engages a pipe stop 22. The pipe stop is a roller sleeve carried by and fitting around an eccentric member 23a connected to the lower end of a rotatable, vertically disposed spindle 23 which is mounted in a block 24. A slide 26 connected to the housing 10 supports the block 24 which is disposed between an adjusting screw 26a at one end of the slide and a coil spring 25 positioned between the housing 10 and the block 24. One end of the spring 25 engages the housing 10 and the other end extends into a recess 24a of the block and there engages it. The spring 25 is under compression and urges and maintains the block 24 in engagement with one end of the adjusting screw 26a.

The adjusting screw 26a positions the pipe stop 22 along the slide 26 to obtain a desired length of threading on the end of the pipe 21. Thus, operation of the adjusting screw 26a moves the pipe stop toward or away from the end of the housing 10 to a given position for production of a desired length of threading.

The adjusting screw 26a has the same number of threads per inch as a first screw adjustable cam 170 (to be described hereinafter and shown in FIGURE 11) which actuates a limit switch 171 (also to be described hereinafter) for initiating a controlled rate of travel of the carriage 6 during the threading operation. In combination with the first screw adjustable cam 170 is a second screw adjustable cam 172 which engages a limit switch 173 to terminate the threading operation.

Accordingly, by turning the adjusting screw 26a to position the pipe stop 22 the same number of turns from a zero point as the first screw adjustable cam from its zero point to determine commencement of the controlled rate of travel of the carriage during threading and by setting the second cam 172, specified lengths of threading on the end of the pipe are easily obtained. Of course, the zero points have a common location on their respective cam or screw.

The pipe stop 22 is mounted upon roller bearings (not shown) carried by the eccentric member 23a so that when the end of the pipe contacts the stop, the stop may turn upon its roller bearings about its central axis as the pipe rotates about its longitudinal axis at a base speed. After the end of the pipe has been securely gripped by the two chucks, and after the end of the pipe has engaged the stop 22, the motor 27 rotates the spindle 23 and the eccentric member 23a about 180° to take the roller out of engagement with the end of the pipe and to provide a clearance for the revolving pipe during the tapering and threading operations.

The stop 22 functions as an electrical conductor and upon engagement by the end of the pipe therewith, transmits an electrical signal to a control system (not shown) indicating that the pipe is positioned in the pipe receiver and that tapering and threading operations may commence.

As shown in FIGURE 3, the primary chuck comprises a chuck body 28 connected to the barrel 11 by bolts 29 so that the primary chuck rotates with the barrel. Movably disposed in cavities 30 of the body are five jaws of which jaw 31 is representative and a description thereof is equally applicable to the other four jaws (not shown). Jaw 31 has a gripping or biting edge 32 which bites into the periphery of the pipe and firmly holds the pipe so that it rotates with the barrel. The primary chuck is designed to exert pressures up to 90,000 pounds on the pipe.

Closing of the primary chuck 17 and movement of the jaw 31 into engagement with the pipe results from travel of a first shifter sleeve 33 to the right, viewing FIGURE 3, whereupon a roller 34 carried at one end of arm 35 of a bell crank lever 36 rides up an inclined shoulder 37 of the first shifter sleeve 33. Travel of the roller 34 up the shoulder 37 swings the bell crank lever 36 counterclockwise, viewing FIGURE 3, causing its other arm 38 to move the jaw 31 into biting engagement with the pipe. The arm 38 extends through an opening 39 in the casing 28 and carries at its outer end a ball 40 which seats in a socket 41 of the body 42 of the jaw.

A coil spring 43 seated upon a projection 44 of the casing 28 engages the body of the jaw and urges it radially away from the pipe. Closing of the chuck overcomes the force exerted by the coil spring 43 to maintain the jaw out of engagement with the pipe. The spring returns the jaw 31 to open position and out of engagement with the pipe when the first shifter sleeve 33 moves into the position shown in FIGURE 3 where the chuck 17 is shown in open position.

The chuck 17 opens when the first shifter sleeve 33 moves to the left, viewing FIGURE 3, thus allowing the spring 43 to withdraw the jaw 31 from engagement with the pipe and swing the bell crank lever 36 clockwise, viewing FIGURE 3, whereby the roller 34 rides down the inclined shoulder 37.

The first shifter sleeve 33 simultaneously operates four other bell crank levers (not shown) the same as the bell crank lever 36 to open and close the other four jaws of the primary chuck 17 in the same way as described in regard to the jaw 31.

Figure 6:
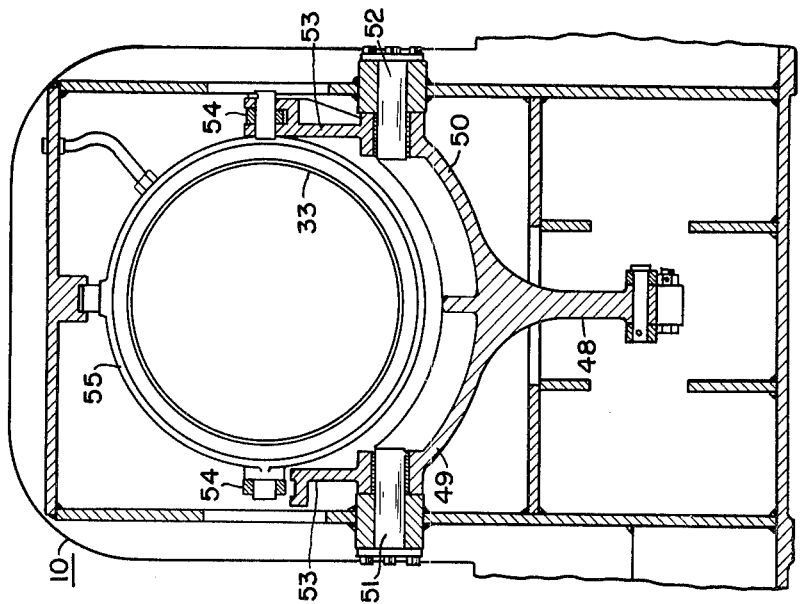
FIGURE 6 is a section view along the line VI—VI of FIGURE 5.
Figure 5:
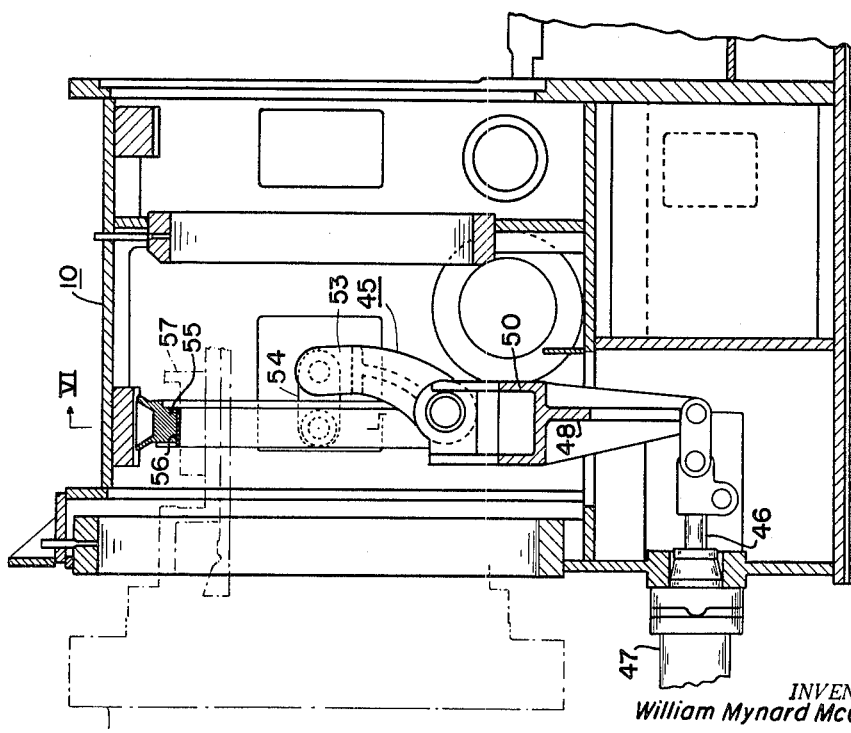
FIGURE 5 is a side elevation view partly in section showing a shifter mechanism of a primary chuck of the threader of FIGURE 1.

FIGURE 3, 5 and 6 show a linkage 45 by which a primary cylinder motor 47 operates the first shifter sleeve 33 to open and close the primary chuck 17. A rod 46 connects the primary cylinder motor 47 to a yoke 48 whose arms 49 and 50 are connected to pivot pins 51 and 52, respectively, each pin being rotatably disposed in the housing 10. Also connected to each pivot pin is one end of a shifter lever 53 whose other end is joined to a connecting link 54. The connecting link 54, in turn, engages a first shifter ring 55 which is received by a bushing 56 of a first block 57 affixed to the first shifter sleeve 33 by bolts such as bolt 57a. In addition to the bushing 56 there are bearings 58 disposed between the first shifter ring 55 and the block 57 whereby the block and the first shifter sleeve are rotatable with the barrel 11 while the first shifter ring 55 remains stationary.

To close the primary chuck 17, the primary cylinder motor 47 moves the rod 46 to the left, viewing FIGURES 3 and 5, thus causing the arms 49 and 50 of the yoke 48 to move to the left and pivot the lever 53 to the right. Then, the first shifter ring 55 travels to the right, viewing FIGURE 3. Travel of the first shifter ring to the right slides the first shifter sleeve 33 to the right relative to the barrel 11 and causes the roller 34 to ride up the inclined shoulder 37 of the first shifter sleeve to force the jaw 31 radially inwardly to engage and grip the pipe.

To open the chuck 17, the primary cylinder motor forces the rod 46 to the right, viewing FIGURES 3 and 5, causing the arms of the yoke 48 to move to the right and pivot the lever 53 to the left, whereupon the first shifter ring 55 travels to the left, viewing FIGURE 3. Travel of the first shifter ring to the left forces the first shifter sleeve 33 to slide to the left relative to the barrel 11, thus permitting the coil spring 43 to raise the jaw 31 from the pipe and simultaneously swing the bell crank lever 36 clockwise. The roller 34 then rides down the inclined shoulder 37 of the first shifter sleeve 33 to the position shown in FIGURE 3.

Figure 9:
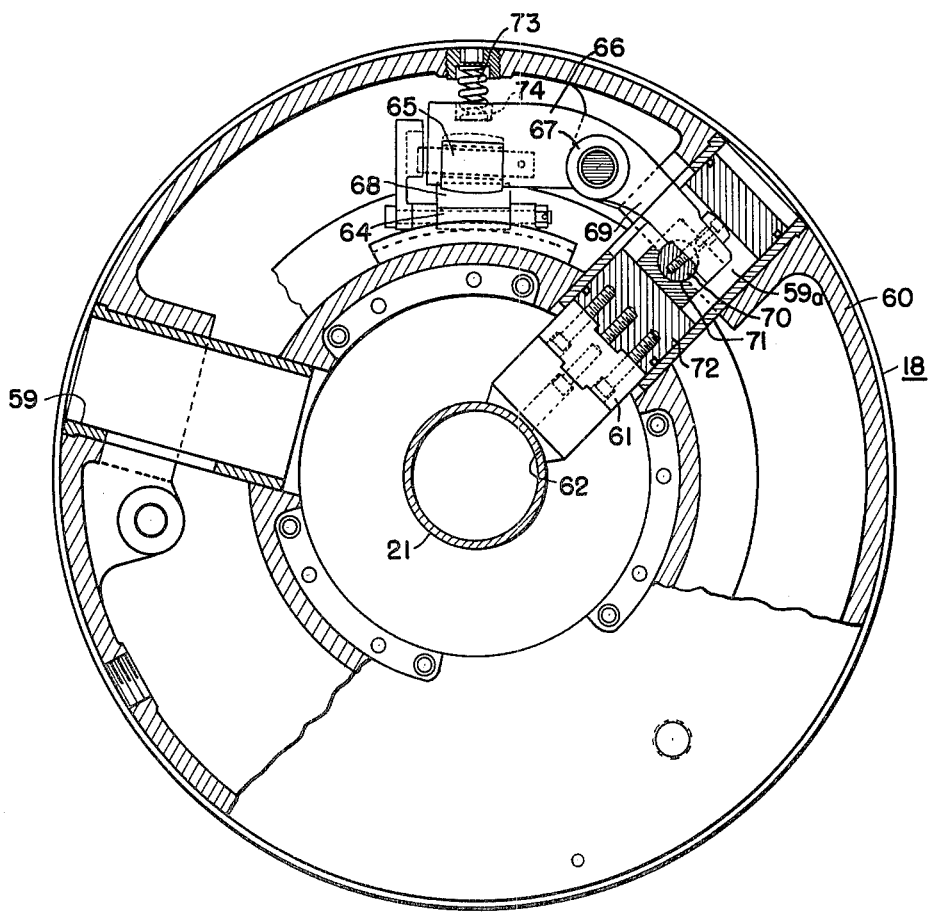
FIGURE 9 is a cross section view of the steady rest chuck.

As shown in FIGURES 3 and 9, the secondary or steady rest chuck 18 comprises three jaws (one shown in detail and the other two not shown, FIGURE 9), movably disposed in cavities 59 in a chuck housing 60. Jaw 61 (shown in detail in FIGURE 9) is representative of the other two jaws and a description thereof is equally applicable to the other two jaws. The jaw 61 has a concave working surface 62 which engages and fits around a part of the periphery of the pipe and does not bite into the periphery of the pipe like the jaw 31 of the primary chuck 17.

The working surface 62 of the jaw 61 supports the pipe adjacent the end which is to be threaded and avoids rounding the end while simultaneously maintaining it in a given position for tapering and threading operations as will be described herein.

FIGURE 3 shows the steady rest chuck 18 in open position and FIGURE 9 shows it in closed position with the jaw engaging a length of pipe. To bring the jaws into closed position, a second shifter sleeve 63 travels to the right, viewing FIGURE 3, and moves a shoulder block 64 carried by the second shifter sleeve to the right so that a roller 65 mounted at one end of one arm 66 of a second bell crank lever 67 rides up an inclined shoulder 68 of the block 64. The bell crank lever 67, which is disposed perpendicularly to the sleeve 63, then rotates clockwise, viewing FIGURE 9, as the roller 65 travels up the inclined shoulder and swings its other arm 69 to move the jaw 61 radially towards the pipe and into engagement therewith. A ball and socket combination connects the arm 69 to the jaw 61 with the arm 69 mounting a ball 70 disposed in a socket 71 of the body 72 of the jaw 61.

To open the steady rest chuck 18, the second shifter sleeve 63 is moved to the left, viewing FIGURE 3, so that the second bell crank lever 67 rotates counterclockwise and the roller 65 travels down the inclined shoulder 68 as the one arm 66 moves radially toward and the other arm 69 radially away from the pipe, viewing FIGURE 9. Since the arm 69 extends into a chamber 59a of jaw body 72 where the ball 70 is located in the socket 71 of the jaw body 72, movement of the arm 69 radially toward and away from the pipe moves the jaw 61 in accordance therewith.

A coil spring 73 has one end seated in the chuck housing 60 of the steady rest chuck and the other end disposed in a recess 74 in the end of the arm 66 which carries the roller 65. This spring urges the arm 66 downwardly and the roller 65 into engagement with the inclined shoulder 68 of the block 64, thereby assisting opening of the chuck upon travel of the second shifter ring to the left, viewing FIGURE 3. The coil spring 73 maintains the jaw 61 out of engagement with the pipe when the steady rest chuck is in the open position, shown in FIGURE 3.

The second shifter sleeve 63 simultaneously operates two other bell crank levers (not shown), the same as the second bell crank lever 67 to open and close the other two jaws of the steady rest chuck in the same way as described in regard to the jaw 61.

Operation of the second shifter sleeve 63 is controlled by a conventional lock valve cylinder motor 75 affixed to one side of the housing 10 (FIGURES 7 and 8). The lock valve cylinder motor works through a linkage 76 connected to the second shifter sleeve 63 to open and close the steady rest chuck. A piston rod 77 of the cylinder 75 is joined to the upper end of a lever 78 whose lower end is keyed to a rotatable shaft 79 disposed within the housing and transversely beneath the barrel 11. Connected to the shaft 79 are two substantially vertical arms 80 straddling the barrel 11 and each extending upwardly to connect with a link member 81. Each link member is joined to a second shifter ring 82 received by a bushing 83 of a second block 84 integral with the second shifter sleeve 63.

To close the steady rest chuck 18, the lock valve cylinder motor forces the piston rod 77 to the right, viewing FIGURE 7, whereupon lever 78 turns the shaft 79 clockwise and causes vertical arms 80 to push the link members 81 to the right. Then, the second shifter ring 82 travels to the right and slides the second shifter sleeve 63 to the right along the chuck housing 60 to operate the bell crank levers 67 and close the chuck 18.

Opening the steady rest chuck results from the piston rod 77 sliding to the left, viewing FIGURE 7, with the lever 78 turning the shaft 79 counterclockwise and causing the vertical arms 80 to push the link members to the left. Then, the second shifter ring 82 rides to the left and slides the second shifter sleeve 63 to the left to open the chuck.

The lock valve cylinder 75 not only controls opening and closing of the steady rest chuck, but also provides a hydraulic lock (to be more fully described hereinafter) for the jaws of the steady rest chuck once a pipe has been engaged thereby. Operation of lock valve cylinder 75 to close the jaws 61 produces pressures up to about 20,000 pounds upon the pipe; whereas, the primary chuck generates gripping pressures up to about 90,000 pounds. In closing upon the pipe, the jaws 61 of the steady rest chuck center and position axially the end to be tapered and threaded so that the tapering and threading tools produce round taper and round threads on the end of the pipe. If the length of pipe has longitudinal bend or camber, the end opposite the end to be tapered and threaded will whip around during rotation of the pipe in the tapering and threading operations, but the end to be tapered and threaded will be positioned and supported by the steady rest chuck in combination with the primary chuck so that it rotates about its longitudinal axis. Rotation of the end to be tapered and threaded about its longitudinal axis is important for production of round taper with round threads thereon. The pressure exerted by the steady rest chuck upon the pipe is enough to center and position the end to be tapered and threaded, but insufficient to round ovalled pipe.

Once the end to be tapered and threaded has been positioned and centered by the jaws 61, the hydraulic lock takes over and maintains the jaws in the position where they have centered and positioned the end to be tapered and threaded. The hydraulic lock does not exert pressure upon the pipe, but maintains the end centered in the steady rest chuck during tapering and threading operations and functions as a backing which resists radial movement of the end out of its centered position. Thus, by use of the hydraulic lock, the end is not subjected to high gripping pressures and stresses and a round taper and round threads result despite presence of ovalling in the end to be tapered and threaded.

As shown in FIGURE 7, the lock valve cylinder 75 has two chambers 85 and 86 separated by a partition 87. A first piston 88 travels in the chamber 85 and a second piston 89 travels in the chamber 86 with the piston rod 77 extending into the cylinder and through the partition and mounting the two pistons 88 and 89. To close the steady rest chuck 18, I deliver air under pressure into the left part 91 of chamber 85 through a conduit 90 and thereby cause the rod 77 and pistons 88 and 89 to travel to the right, viewing FIGURE 7. During travel of the pistons 88 and 89 to the right, a conduit 92 permits escape of the air from part 93 of the chamber 85 on the right side of the piston. Correspondingly, in opening the chuck, air flows through conduit 92 to part 93 of the chamber 85 and forces the pistons 88 and 89 to the left, viewing FIGURE 7, whereupon air escapes from part 91 of the chamber 85 to the atmosphere.

A pipe 94 connects part 95 of the chamber 86 on the left-hand side of the piston 89 with part 96 of the chamber 86 on the right-hand side of the piston 89 (viewing FIGURE 7) and thereby forms a closed system. Hydraulic fluid such as oil fills both parts 95 and 96 of the chamber 86 and the pipe 94 and flows from part 95 to part 96 or vice versa, depending upon direction of travel of the piston 89. Connected into the pipe 94 is a valve 97 which when closed locks the volume of oil then present in both parts 95 and 96 of the chamber.

Closing of the valve 97 forms the hydraulic lock previously discussed herein. The valve 97 is closed after the jaws 61 have engaged the pipe whereby the oil is locked in both parts of the chamber 86. Air pressure in the chamber 85 may or may not be released following closure of the valve 97. With the valve 97 closed, the jaws 61 do not exert a pressure upon the pipe but maintain or hold it in position. Should the pipe attempt to move out of its position, the hydraulic lock, backing the jaws 61 through the linkage for opening and closing the jaws, resists any radial movement out of position.

When the steady rest chuck is to be opened, the valve 97 is first opened to permit the rod 77 to travel to the left, viewing FIGURE 7, when air under pressure is delivered into part 93 of the chamber 85.

Tapering and threading operations can be effected without the hydraulic lock by leaving the valve 97 open after the jaws 61 have engaged and closed upon the end to be tapered and threaded. When the hydraulic lock is not utilized during the tapering and threading operations, the steady rest chuck exerts a pressure upon the end to be tapered and threaded substantially less than the pressure applied by the primary chuck. Generally, the pressure applied by the steady rest chuck to the pipe during tapering and threading without the hydraulic lock is up to about 20,000 pounds and is insufficient to round an ovalled end.

The lock of the steady rest chuck need not be hydraulic, but can also be mechanical.

Referring to FIGURES 2, 3 and 10, the carriage 6 which mounts the tools for tapering the end of the pipe and the chasers for imparting thread to the pipe 21 moves longitudinally on the frame along a path of travel parallel to the longitudinal axis of the barrel 11. Movement of the carriage 6 on the frame is over the ways 4 and 5 to bring the tools into engagement with the pipe supported in the barrel 11. A carriage cylinder motor 98 affixed to the frame 2 supplies motivating power for advancing the carriage toward the pipe through connection of its piston rod 99 with the carriage 6.

The carriage 6 includes a cross slide away 100 extending transversely of the ways 4 and 5 as shown in FIGURES 3 and 10 and a pair of slide rails 101 and 102 affixed thereto for slidable engagement with and over the ways 4 and 5 respectively. The cross slide way is keystone-shaped and slidably mounts a pair of tool platens 105 and 106. The tool platens travel toward and away from each other on the cross slide way 100 and straddle the pipe 21 supported by the barrel 11. On each tool platen is a tool block, block 107 on platen 105 and block 108 on platen 106, which is movable thereon along a path of travel parallel to that of its platen. The tool block 107 carries the tool holder 7 and the block 108 carries the tool holder 8. Each tool holder has a taper tool 109 for tapering the end of the pipe and a chaser 110 for imparting threads thereto with the chaser carried by tool holder 8 slightly advanced relative to the chaser mounted on tool holder 7.

A screw shaft 111a extends between a post 111 affixed to each tool block and an upright 112 of each tool platen. Rotation of the screw shaft brings the tool block and its tool holder into a given position for tapering and threading the end of a pipe of a particular diameter. Once the screw shaft has moved the tool block into the given position, bolts 113 lock the tool block at the given position upon the tool platen.

The tool blocks 107 and 108 are carefully positioned and aligned to insure accurate location of the taper tools and chasers relative to the pipe end to be tapered and threaded.

Travel of the chasers while in engagement with and along the pipe during threading thereof is controlled by a thread pitch cam disk 151 (FIGURE 3) keyed to a driven shaft 152 journaled upon frame 2. Rotation of the cam disk is related to revolutions of the barrel 11, thereby controlling thread pitch and assuring a uniform pitch in the threads. The drive shaft 14 which is driven by the motor 12 and which drives the barrel 11 through worm gearing 15 and 16 in turn drives a second shaft through a worm gear reducer. The second shaft then drives the shaft 152 which mounts the cam disk through a second worm gear reducer and a clutch.

A cam follower 157 supported by the carriage 6 engages the cam disk 151 upon advancement of the carriage towards the pipe receiver. The carriage cylinder motor maintains the cam follower in engagement with the disk cam so that rate of feed of the chaser to the pipe is controlled by the cam disk 151 for regulation of thread pitch. On one threader the drive shaft 14 has a speed range of 180 to 720 r.p.m.; whereas the shaft 152 has a speed range of .1 to .4 r.p.m.

A hydraulic motor connected to the shaft returns the cam to its starting position upon completion of tapering and threading and after disengagement of the clutch.

As shown in FIGURE 11, the carriage 6 has a cam bracket 174 which mounts the first screw adjustable cam 170 and the second screw adjustable cam 172. Both screw adjustable cams travel with the carriage 6 over the ways 4 and 5 and each screw adjustable cam is adjustable to a given position on the cam bracket independent of the other screw adjustable cam. The first screw adjustable cam 170 is positioned on the bracket to engage a limit switch 171 attached to the frame 2 and the second screw adjustable cam 172 is located to engage a limit switch 173 also attached to the frame 2. Contact of limit switch 171 by screw cam 170 generates an electrical signal which functions through conventional circuits (not shown) to bring about operation of a cylinder motor to move a lever connected to the clutch. Movement of the level engages the clutch whereupon the cam disk begins to rotate.

Both screw adjustable cams 170 and 172 have a threaded shaft which extends through a threaded bore of a lug of the cam bracket. Thus, the screw cam 170 can be positioned longitudinally of the carriage to determine where it engages the limit switch 171 and the screw cam 172 can also be located to determine where it strikes limit switch 173 to terminate threading.

In the event the limit switch 173 fails to terminate threading, or in the event something happens to the pipe in the receiver 3, forward movement of the carriage 6 towards the receiver 3 is interrupted by actuation of a limit switch 175 by the cam disk 151 (FIGURE 11). When limit switch 175 is actuated by the disk 151, the tool platens move away from the pipe and the carriage is returned to its starting position. The limit switch 175 is located so that its actuation occurs when the cam disk 151 has rotated beyond that position where the second screw adjustable cam normally actuates the limit switch 173 to terminate the threading operation.

In operation of the pipe threader 1, tapering of the end of the pipe is completed or substantially completed before threading commences. The rate of advancement of the carriage 6 along the ways 4 and 5 during the tapering operation results from a metered feed of hydraulic fluid to the cylinder motor 98. When the cam follower engages the disk 151, the disk controls advancement of the carriage along the ways and thereby regulates the pitch of the threads imparted by the chasers. To insure that the cam follower 157 remains in engagement with the cam disk throughout the threading operation, feed of hydraulic fluid to the cylinder motor 98 increases upon actuation of the limit switch 171 by the first screw adjustable cam 170.

Tapering and threading an end of pipe on my pipe threading machine comprises delivery of a length of pipe to and into the pipe receiver by conventional table rolls (not shown). The pipe enters the pipe receiver through the primary chuck and the end to be tapered and threaded travels out through the steady rest chuck into engagement with the pipe stop and into lengthwise position for the tapering and threading operations. In the event the pipe is rotating upon engagement with the stop, the mounting of the stop permits it to revolve with the pipe. Next, the primary chuck rotating at a base speed closes and grips the pipe and thereafter the steady rest chuck also rotating at the base speed closes and engages the pipe, thereby centering and positioning axially the end of the pipe. After closing of the two chucks, the pipe stop rotates out of engagement with the end of the pipe and rate of rotation of the pipe receiver and the pipe advances to a predetermined rate for the tapering and threading operations. Next, the tool platens move the taper tools and chasers into position for tapering and threading the pipe and bring the sine bar rollers into engagement with the sine bar. Then, the carriage cylinder motor advances the carriage from its starting position towards the pipe receiver until the tapering tools engage the end of the pipe, whereupon a metered feed of hydraulic fluid to the motor cylinder 98 regulates rate of travel of the carriage 6 along the ways for the tapering operation. As the tapering operation is completed, the cam follower engages the thread pitch cam disk which has commenced rotation upon engagement of the clutch. Thereafter, the rate of feed of the chasers to the pipe is regulated by rotation of the cam disk with the cam follower in engagement therewith as the motor cylinder 98 urges the carriage along the ways towards the pipe receiver. After completion of the tapering and threading operation, the tool platens separate; the carriage cylinder motor returns the carriage to its starting position; the clutch disengages; and the hydraulic motor returns the cam disk to its starting position.

My invention has important advantages which render it valuable for pipe and tube manufacturers. In the first place, the steady rest or second chuck holds the pipe on center and positioned axially adjacent the end which is threaded and/or tapered, without rounding an ovalled end and without application of pressure to the pipe, thereby insuring that the threads will be round even if the pipe is oval, and avoiding subjection of the pipe walls to excessive pressures and stresses.

In the second place, the steady rest chuck, in combination with the primary chuck, reduces and in some cases eliminates whipping of an end of pipe to be tapered and threaded during the tapering and/or threading operations, where the end is a part of a cambered length of pipe.

While I have shown and described a preferred embodiment of my invention, it may be otherwise embodied within the scope of the following claims.

I claim:

1. In a pipe threading machine having a frame, the invention comprising a rotatable sleeve mounted on said frame and adapted to be connected to a source of power for rotating same, said sleeve being adapted to receive a length of pipe therein, including an end of the length which is to be threaded, said end of the length extending a short distance out through an end of said sleeve, a first chuck carried by said sleeve and rotatable therewith, said first chuck being located on said sleeve substantially adjacent the end thereof opposite the end through which the end of the pipe extends, said first chuck having movable jaws with biting edges connected to means for moving them into and out of engagement with the periphery of the pipe, a second chuck carried by the sleeve and rotatable therewith, said second chuck being positioned substantially adjacent the end of the sleeve through which the end of the pipe extends and having jaws adapted to engage and shaped to fit around at least a part of the periphery of said pipe and connected to means for moving them into and out of engagement with the pipe, lock means in operative connection with the jaws of said second chuck, said lock means being a movable piston disposed in a fluid filled cylinder, said piston being in operative connection with said jaws and dividing said cylinder into two chambers, a conduit interconnecting said two chambers for flow of fluid therebetween in response to movement of said piston, valve means connected into said conduit so that closing said valve means prevents flow of fluid between said chambers and movement of said piston whereby said lock means acting through said jaws resists radial movement of said pipe without application of pressure thereto and so that opening said valve means disconnects said lock means.

2. The invention of claim 1 characterized by said lock means being hydraulic.

3. A chuck for engaging and holding a workpiece comprising a housing having an opening for receiving therein said workpiece, at least two jaws movably mounted and arranged in said housing for travel into and out of engagement with the periphery of said workpiece, linkage means connecting said jaws to means for moving said jaws into and out of engagement with said workpiece, lock means in operative connection with said jaws, said lock means being a movable piston disposed in a fluid filled cylinder, said piston being in operative connection with said jaws and dividing said cylinder into two chambers, a conduit interconnecting said two chambers for flow of fluid therebetween in response to movement of said piston, valve means connected into said conduit so that closing said valve means prevents flow of fluid between said chambers and movement of said piston whereby said lock means acting through said jaws resists radial movement of said workpiece without application of pressure thereto and so that opening said valve means disconnects said lock means.

4. The chuck of claim 3 characterized by said jaws having a surface adapted to engage and fit about a part of the periphery of said workpiece.

5. A chuck for engaging and holding a workpiece comprising a housing having an opening for receiving therein said workpiece, at least two jaws movably mounted and arranged in said housing for travel into and out of engagement with the periphery of said workpiece, linkage means connecting said jaws to means for moving said jaws into and out of engagement with said workpiece, lock means in operative connection with said linkage means, said lock means being a movable piston disposed in a fluid filled cylinder, said piston being in operative connection with said linkage means and dividing said cylinder into two chambers, a conduit interconnecting said two chambers for flow of fluid therebetween in response to movement of said piston, valve means connected into said conduit so that closing said valve means prevents flow of fluid between said chambers and movement of said piston whereby said lock means acting through said linkage means and said jaws resists radial movement of said workpiece without application of pressure thereto and so that opening said valve means disconnects said lock means.

6. The chuck of claim 5 characterized by said lock means being hydraulic.

7. In a chuck for engaging and holding a workpiece, said chuck having a housing with an opening for receiving therein said workpiece, the invention comprising at least two jaws movably mounted and arranged in said housing for travel into and out of engagement with the periphery of said workpiece, linkage means connecting said jaws to means for moving the jaws into and out of engagement with the workpiece, lock means in operative connection with said jaws, said lock means being a movable piston disposed in a fluid filled cylinder, said piston being in operative connection with said jaws and dividing said cylinder into two chambers, a conduit interconnecting said two chambers for flow of fluid therebetween in response to movement of said piston, valve means connected into said conduit so that closing said valve means prevents flow of fluid between said chambers and movement of said piston whereby said lock means acting through said jaws resists radial movement of said workpiece without application of pressure thereto and so that opening said valve means disconnects said lock means.

8. In a chuck for engaging and holding a workpiece, said chuck having a housing with an opening therein for receiving said workpiece, the invention comprising at least two jaws movably mounted and arranged in said housing for travel into and out of engagement with the periphery of said workpiece, linkage means connecting said jaws to means for moving the jaws into and out of engagement with said workpiece, lock means in operative connection with said linkage means, said lock means being a movable piston disposed in a fluid filled cylinder, said piston being in operative connection with said linkage means and dividing said cylinder into two chambers, a conduit interconnecting said two chambers for flow of fluid therebetween, valve means connected into said conduit so that closing said valve means prevents flow of fluid between said chambers and the movement of said piston whereby said lock means acting through said linkage means and said jaws resists radial movement of said workpiece without application of pressure thereto and so that opening said valve means disconnects said lock means.

References Cited by the Examiner
UNITED STATES PATENTS

| 1,925,109 | 9/1933  | Olson       | 279—4   |
| 2,184,136 | 12/1939 | Benninghoff | 10—107  |
| 2,565,330 | 8/1951  | Sundt       | 279—4   |
| 3,108,819 | 10/1963 | McKay       | 279—4   |

ANDREW R. JUHASZ, *Primary Examiner.*